US009378255B2

(12) United States Patent
Jaeger et al.

(10) Patent No.: US 9,378,255 B2
(45) Date of Patent: Jun. 28, 2016

(54) CLOUD LOGISTICS

(71) Applicants: Peter Jaeger, Heidesheim (DE); Ralf Lindenlaub, Walldorf (DE)

(72) Inventors: Peter Jaeger, Heidesheim (DE); Ralf Lindenlaub, Walldorf (DE)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 13/890,954

(22) Filed: May 9, 2013

(65) Prior Publication Data

US 2013/0304693 A1    Nov. 14, 2013

Related U.S. Application Data

(60) Provisional application No. 61/645,894, filed on May 11, 2012.

(51) Int. Cl.
*G06F 17/30* (2006.01)
*G06F 9/445* (2006.01)
*G06Q 90/00* (2006.01)

(52) U.S. Cl.
CPC ............ *G06F 17/30563* (2013.01); *G06F 8/61* (2013.01); *G06Q 90/00* (2013.01)

(58) Field of Classification Search
USPC ......................................................... 707/602
See application file for complete search history.

(56) References Cited

U.S. PATENT DOCUMENTS

| 8,856,889 | B2 * | 10/2014 | Alwar | G06F 8/10 726/4 |
| 8,862,633 | B2 * | 10/2014 | Friedman | 707/803 |
| 2004/0177352 | A1 | 9/2004 | Narayanaswamy et al. | |
| 2006/0005189 | A1 | 1/2006 | Vega et al. | |
| 2008/0104379 | A1 | 5/2008 | Peterman et al. | |
| 2009/0249279 | A1 * | 10/2009 | Bourdon | G06F 8/61 717/101 |
| 2009/0249284 | A1 * | 10/2009 | Antosz | G06F 8/10 717/104 |
| 2009/0282404 | A1 | 11/2009 | Khandekar et al. | |
| 2009/0300057 | A1 | 12/2009 | Friedman | |
| 2009/0300149 | A1 * | 12/2009 | Ferris | H04L 47/826 709/222 |
| 2009/0313620 | A1 | 12/2009 | Sedukhin et al. | |
| 2009/0328030 | A1 | 12/2009 | Fries | |
| 2010/0306767 | A1 | 12/2010 | Dehaan | |

(Continued)

OTHER PUBLICATIONS

U.S. Appl. No. 13/890,966, filed May 9, 2013, Preassembled, Rapidly Deployable Systems and Components.

(Continued)

*Primary Examiner* — Debbie Le
(74) *Attorney, Agent, or Firm* — Schwegman Lundberg & Woessner, P.A.

(57) ABSTRACT

Implementations of complex software solutions are accompanied with an intrinsic conflict between requirements, such as an ever-growing complexity of enterprise software solutions versus a demand for more and more shortened implementation cycles. Various embodiments include at least one of systems methods and software to address such conflicts. One method embodiment includes receiving a request to assemble a virtual appliance from at least one deployment template, the request including characteristic data representative of at least one virtual appliance functional and deployment requirement. In response to the received request, such embodiments may query a template warehouse to identify and deployment templates from a template warehouse to a data storage device to form a virtual appliance. The virtual appliance may then be packaged into a transport data structure and stored. The transport data structure may then be transported by various means to a target virtual machine and deployed therein.

17 Claims, 4 Drawing Sheets

(56) References Cited

U.S. PATENT DOCUMENTS

| | | | |
|---|---|---|---|
| 2010/0306772 A1 | 12/2010 | Arnold et al. | |
| 2010/0332617 A1* | 12/2010 | Goodwin | G06F 9/455 709/219 |
| 2011/0154331 A1 | 6/2011 | Ciano et al. | |
| 2011/0202916 A1 | 8/2011 | Voba et al. | |
| 2011/0209144 A1 | 8/2011 | Rowe et al. | |
| 2012/0144236 A1 | 6/2012 | Black et al. | |
| 2012/0246639 A1* | 9/2012 | Kashyap | G06F 9/45558 718/1 |
| 2012/0284234 A1 | 11/2012 | Mashtizadeh et al. | |
| 2012/0311106 A1 | 12/2012 | Morgan | |
| 2013/0297922 A1* | 11/2013 | Friedman | G06F 8/63 713/2 |
| 2013/0305244 A1 | 11/2013 | Pohlmann et al. | |
| 2014/0189430 A1* | 7/2014 | Hilliges | G01R 31/2834 714/27 |

OTHER PUBLICATIONS

U.S. Appl. No. 13/890,966, Non Final Office Action mailed Mar. 27, 2015, 39 pgs.

U.S. Appl. No. 13/890,966, Response filed Sep. 16, 2015 to Non Final Office Action Mar. 27, 2015, 16 pgs.

"Oracle VM Template Developers Guide: Creating Pre-Built VMs for Rapid Software Deployment", An Oracle Technical White Paper, (Feb. 2009), 29 pgs.

European Application Serial No. 13002508.3, Extended European Search Report mailed Oct. 15, 2013, 9 pgs.

Abele, Andrejs, "Ontology based configuration of virtual systems in a computer cloud", 4th Conference on Learning in Networks, [Online]. Retrieved from the Internet: <URL: http:alephfiles.rtu.lv/TUA01/0000348 56 e.pdf>, (Aug. 20, 2010), 7-15.

Hitzler, Pacal, et al., "OWL 2 Web Ontology Language Primer", WBC Webpage, [Online]. Retrieved from the Internet: <URL: www.w3.org/TR/2009/REC-owl2-pri mer-20091027>, (Oct. 27, 2009), 34 pgs.

U.S. Appl. No. 13/890,966, Examiner Interview Summary mailed Feb. 25, 2016, 3 pgs.

U.S. Appl. No. 13/890,966, Notice of Allowance mailed Mar. 28, 2016, 18 pgs.

U.S. Appl. No. 13/890,966, Response filed Feb. 22, 2016 to Final Office Action mailed Dec. 21, 2015, 12 pgs.

U.S. Appl. No. 13/890,968, Final Office Action mailed Dec. 21, 2015, 23 pgs.

* cited by examiner

CLOUD LOGISTICS

RELATED APPLICATION

This application is related and claims benefit to U.S. Provisional Application Ser. No. 61/645,894, filed May 11, 2012 and entitled "CLOUD LOGISTICS", the entirety of which is incorporated herein by reference.

BACKGROUND INFORMATION

Implementations of complex software solutions, such as Enterprise Resource Planning applications available from companies such as SAP AG of Walldorf, Germany, are accompanied with an intrinsic conflict between two requirements: the ever growing complexity of enterprise software solutions on the one hand versus the demand for more and more shortened implementation cycles. An additional conflict is cost as not only are such software systems expensive to procure, install, configure, and maintain, risk exposure and costs associated with this exposure can be quite high.

DETAILED DESCRIPTION

Figure 1:
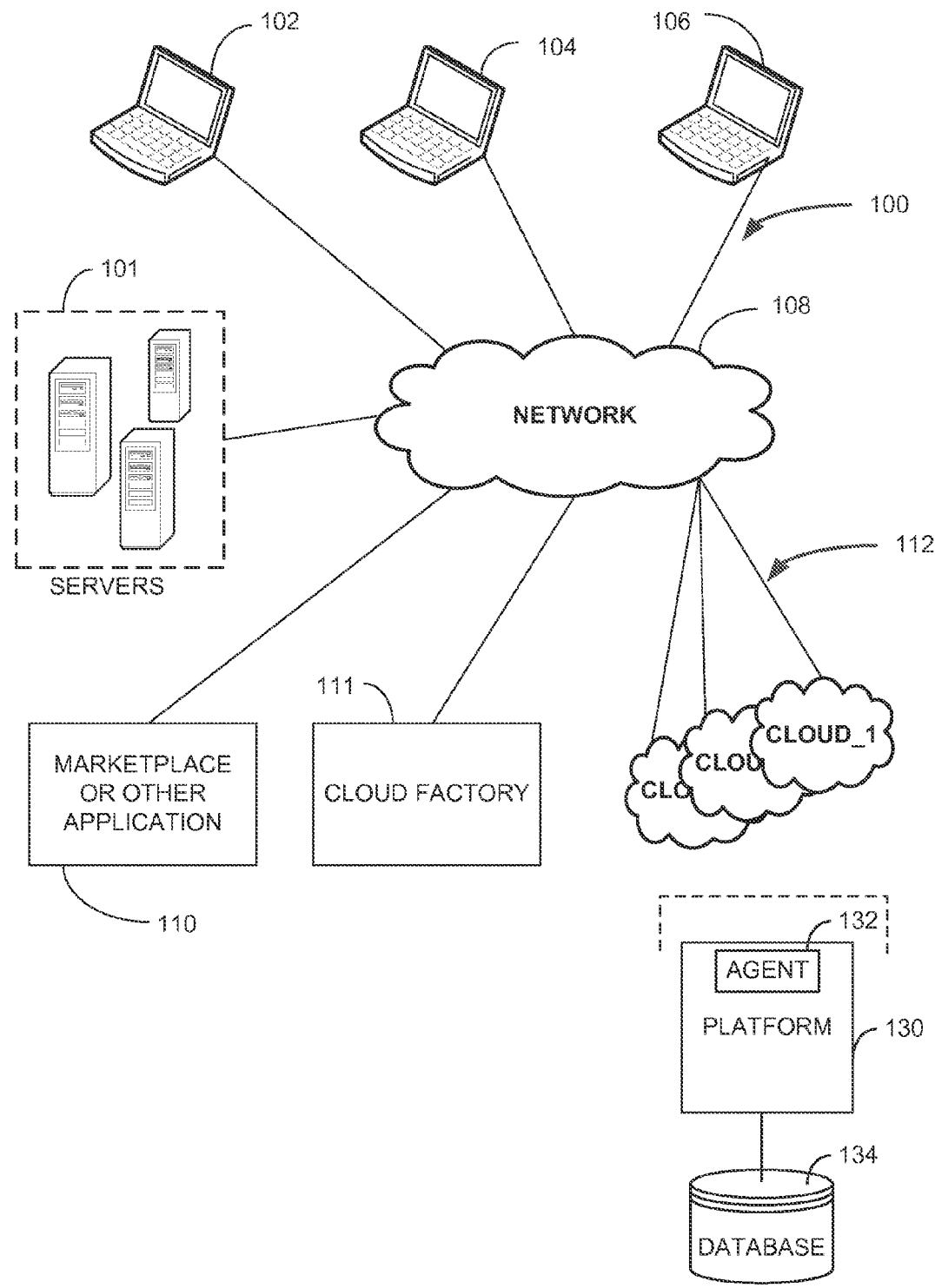
FIG. 1 is a logical block diagram of a networked computing environment, according to an example embodiment.

Implementations of complex software solutions, such as ERP applications available from companies such as SAP AG of Walldorf, Germany, are accompanied with an intrinsic conflict between two requirements: the ever growing complexity of enterprise software solutions on the one hand versus the demand for more and more shortened implementation cycles. "Cloud Logistics" addresses this very conflict.

Cloud Logistics deals with the management of the flow of software solutions and configurations between the point of initial installation/configuration and the point of destination by means of cloud technologies. Embodiments herein explore various aspects of some Cloud Logistic embodiments including its definition, its building blocks and underlying ontology, related objectives, and elaboration on of various relevant cloud supply chains.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

One element of cloud logistics is the transport of software solutions from a master area where software solutions are assembled from templates to form virtual appliances to a final destination. The final destination may be for purposes of a demonstration system or a live, productive system. Regardless, such embodiments operate to allow a virtual software appliance to be assembled in an "appliance factory" from pre-existing software elements that are modular in nature to form the end product that can be easily deployed.

Another element of cloud logistics is a standardized infrastructure provided within virtual computing environments, such as virtual machines, either by augmenting or extending platform services or through installation of an agent within virtual computing environments. Regardless of the form, virtual environments in some embodiments are augmented to include services to receive and deploy virtual software appliances and to generate a virtual software appliance from a software system instance as deployed, such as through software system cloning. The standardization also goes further to naming conventions of different components, to communication interfaces, database tables and columns, platforms, and ontologies for describing and indexing both functional and capability characteristics of software and hardware elements.

Thus, various cloud logistics embodiments include warehouse elements that store templates from which virtual software appliances are assembled by virtual software appliance factories. Such embodiments further include transport mechanisms through which assembled virtual software appliances are distributed.

Templates from which virtual software appliances are assembled generally include binaries, configuration data, and data files that are pre-configured, pre-tested, and interoperable with one another when assembled into a virtual software appliance. Virtual software appliances can be rapidly assembled and deployed. Thus, as templates are pre-configured, pre-tested, interoperable, can be rapidly assembled, and are rapidly deployable, live and usable systems can be deployed or augmented by a virtual software appliance. This reduces risk, decreases cost, increases abilities to try software solutions before purchase, among many other benefits.

This description explores various aspects of Cloud Logistics including its definition, its underlying ontology, related objectives, and elaboration on various embodiments.

To understand cloud logistics embodiments, first consider definitions of the words "cloud" and "logistics." Clouds are generally large pools of virtualized computing resources with elasticity, easy usability, pay-per-use, and customized SLAs. Within a cloud, the flow of things is technically achieved by the exploitation of virtualization technology for purposes such as application mobility, improved disaster recovery, and improved allocation of computing resources.

Logistics can be viewed as integrated planning, control, realization, and monitoring of internal and network-wide materials, parts, and product flow including the information flow along value-chains and throughout a product life cycle for the purpose of conforming to customer requirements. Customer requirements and business requirements are generally needs of a customer for various purposes and may not be hard constraints, but rather more of a customer desire for a system, process, and the like. Customer requirements and business requirements are therefore not intended to be a hard requirement in all instances.

The combined terms into cloud logistics is intended to include consideration of a) the material, parts and products that are flowing through the cloud and b) customer requirements in general. In particular, the products flowing through the cloud are software solutions in the sense of a set of integrated and customized applications that satisfy certain customer and business requirements. As a number of applications employed in a business and along with it the technical heterogeneity tends to increase causing solutions and computing environments to become quite complex and thereby raising interesting logistical challenges.

Thus, cloud logistics denotes integrated planning, implementation, and control of internal and network-wide flow and storage of material (hardware and virtualized components), and complex software solutions and components thereof including the information flow and required services along the value-chain and product life cycle for the purpose of conforming to customer and business requirements including the mode of delivery.

As mentioned briefly above, standardization is used in many regard in cloud logistics. Standardization is central to communication between different cloud logistics processes. Whether a communication is of customer or business requirements, a query of a template repository to identify software elements for inclusion in a virtual software appliance, information flow along the complete value chain should align.

Further, the complexity of cloud logistics demands that the employed data are semantically well-defined to avoid misunderstandings and also loss of information when a) data is exchanged between different information systems that support different building blocks of the cloud logistics value chains or b) as different stakeholders try to communicate about the same things. A standardized ontology is therefore generally utilized as a shared conceptualization that connects the various building blocks and layers of Cloud Logistics and which is intended to facilitate model-driven approaches to the cloud-logistical information management.

While the specific ontology, or Cloud Logistics Ontology (CLO), utilized in different embodiments and the syntax used therein may vary, there are different considerations to take into account when forming the ontology. Such considerations include:

The domain of the CLO cover the relevant layers and building blocks and aspects of Cloud Logistics;
The CLO should anticipate business, functional, and hardware competencies;
The CLO should be based on a well-defined framework for capturing knowledge;
The CLO should be semantically and logically sound;
The CLO should be decidable;
The CLO should be partitioned into domains and subdomains as the CLO may be large or grow to be large;
The CLO should be able to incorporate or at least be compatible with already existing conceptualizations;
The CLO should incorporate namespaces (e.g. to differentiate (sub-)domains, project-specific concepts or concepts stemming from different organizations);
The CLO should be based on accepted technical and/or business industry standards (or de-facto standards);
The CLO should have a standardized exchange format (i.e., as XML);
The CLO should be equipped or compatible with a powerful query language (e.g., a database management system can build indexes based thereon); and
The CLO should support reasoning (so that actually more knowledge may be derived than just the store facts).

In some embodiments, the CLO may be implemented in Web Ontology Language OWL, version 2, recommended by the W3C organization. OWL is formally based on description logic, which is a formalism for representing knowledge providing a well-defined framework. It allows formalization of the semantics of knowledge domains, it may, however, not automatically ensure the logical soundness of the model. Therefore, this is in the responsibility of the ontology authors.

The CLO may be divided into domains, in some embodiments. The domains are generally targeted at different cloud logistics categories. For example, such categories may include hardware resources, software resources, cost, quality, risk, and the like. Different embodiments may utilize different elements of the CLO in identifying not only different templates and options to include in a virtual software appliance to meet a business or customer need, but to identify and include templates that when combined not only meet system functional needs, but also business needs, policies, cost points, risk thresholds and the like. These and other embodiments are described with further reference to the figures.

FIG. 1 is a logical block diagram of a networked computing environment 100 according to an example embodiment. The networked computing environment 100 includes an enterprise computing environment 101 coupled to a network 108. The enterprise computing environment 101 is a computing environment within which enterprise computer systems operate. The enterprise computer systems may include ERP, accounting, CRM, and other computing applications that support an enterprise and are accessible by client computing devices 102, 104, 106 via the network 108. The network 108 may include one or more of a local area network (LAN), a wide area network, the Internet, and other network types. Although only three client computing devices are illustrated, any number of client computing devices may be present in various embodiments.

In some embodiments, the networked computing environment 100 also includes cloud computing environments 112. Each cloud computing environment 112 is a network resource accessible via the network 108. The cloud computing devices 112 generally provide one or both of computing and storage capacity via the network 108 as services. A cloud computing environment 112 typically includes a virtualized environment that is logically distinct from other computing environments that may execute on the same hardware, but are each individually accessible. Thus, one cloud computing environment may include a hardware set, such as one or more server computers having one or more virtual machines that each provide a computing environment within which computer applications may execute. In some embodiments, an application server or other process within which data and service requests may be received via the network 108 and serviced execute within a virtual machine computing environment. A cloud computing environment may also include a database or other data storage application or arrangement logically located therein. In some embodiments, the enterprise computing environment 101 may be a cloud computing environment within which the enterprise applications execute and are accessed by the client computing devices 102, 104, 106.

Some embodiments include a marketplace 110 network location accessible via the network 108. The marketplace 110 is a network resource that provides enterprise computing application customers, including actual and prospective customers, access to computer application resources. Such computer application resources may include entire applications, add-on or enhancement functionality, additional content, and other options with regard to computing applications. Such computing applications are typically enterprise computing applications, such as ERP, CRM, accounting, and other similar computing applications utilized by organizations. These computing applications may be deployed within the enterprise computing environment 101, within one or more of the cloud computing environments, or elsewhere. Thus, when a user associated with an organization visits the marketplace 110, such as by using a client computing device 102, 104, 106 to access the marketplace 110, the user typically desires to learn about available software applications, add-on or enhancement functionally, additional content, and other options with regard to such computing applications the organization has deployed or is considering deploying.

The marketplace 110 may be one or more of a website, an app that executes on a computing device or within a computer program such as a web browser, or other accessible content or applications that marketplace visitors may utilize. In a typically embodiment, the marketplace 110 is a website that delivers information with regard to available computing applications, add-on or enhancement functionality, additional content, and other options with regard to computing applications and is accessed via the network 108 utilizing a client computing device 102, 104, 106. The marketplace 110 may provide marketing content in various forms to generate marketplace 110 visitor interest or knowledge in one or more offerings via the marketplace 110.

When a visitor is interested, the visitor may visit a portion of the marketplace 110 to obtain a cloud-hosted demonstration application or add-on to an existing application or to select additional content or functionality enhancements for a computing application of an organization. For example, the visitor may be with an organization that already has deployed an ERP application and the visitor desires to obtain a demonstration of a Human Resources Management module add-on to the ERP application. In another example, a visitor does not yet have a computing application offered via the marketplace 110 and provides input requesting a demonstration instance of an entire ERP application. In yet another embodiment, a visitor may have a computing application and select an add-on or enhancement of the application for deployment thereof right away for productive use. In all of these examples, the marketplace 110 provides options for items available via the marketplace 110 and the visitor is provided assistance in choosing and deploying the proper item to a suitable location.

In some embodiments, the marketplace 110 provides selectable listings of at least one product offering. The selectable listing may be provided as a set of "check boxes," as a wizard-like process guiding the visitor through a set of options, and other listing types as may be relevant based on the context of the offerings and possible configuration and deployment options thereof, and customer or business specific requirements. In particular, each of the items offered via the marketplace, in some embodiments, may be in the form of deployment templates. Each item offered may exist in the form of multiple deployment templates and the options presented to the marketplace 110 visitor enable selection and deployment of a deployment template configured to meet the requirements and needs of the visitor's organization A deployment template may exist for an entire computing application (e.g., an ERP, CRM, HRM applications), add-ons or enhancements to an application (e.g., business intelligence module, mobile module, language or other application localization module or content, warehouse management, logistics processes), content (e.g., key performance indicators, promotional campaign definitions, compliance requirements, workflow processes), data (e.g., contact lists), and the like. Deployment templates are generally pre-assembled, pre-configured, and pre-tested for their respective purposes. As such, deployment templates can essentially be "plugged-in" to one another and they function for their intended purpose. Deployment templates are generally gathered and assembled into a virtual software appliance which can then be packaged and transported to a destination computing environment for deployment.

A cloud factory 111 is included in the system 100 in such embodiments. As the marketplace 110 or other application, such as a system administration application, collects user input with regard to customer, system, and business requirements, those requirements are linked to a CLO of the particular embodiment. The cloud factory 111 utilizes the CLO to map the received requirements to deployment templates stored in a template warehouse, indexed according to the CLO. The deployment templates may then be assembled by the cloud factory into a virtual software appliance. The virtual software appliance may then be instantiated in a virtual environment and modified through custom development and configuration or deployed.

When deployed, the virtual software appliance is typically packaged into a transport data structure and then transported. The transport may be over the network 108 or via a portable medium, such as a disk or USB memory device. The transport will typically be to a platform 130, such as a virtual machine in the cloud. The transport will typically leverage platform 130 services or services on provided on the platform by an agent 132 program. The agent 132 upon receipt of a transport data structure will unpack the virtual software appliance therefrom and deploy the portions thereof to suitable locations within the platform 130, to a connected database 134, which may also be deployed as part of a virtual software appliance, or to another data storage location. The locations to which the portions are to be deployed are defined within data of the transport data structure and are provided in a form that is instructive to the agent 132.

As a result, demonstration systems and modules can be quickly provided to prospective customers for entirely new systems and to enhance or expand existing systems. For purposes of demonstration systems, deployment templates included in a virtual software appliance may include sample or demonstration data. In some embodiments, options may be provided to allow upload data for a demonstration system or for data to be copied from an existing system to the demonstration system. A rapidly deployed demonstration system quickly provides an organization the ability to try a system or module and evaluate whether the system or module meets their needs and expectations.

The options provided via the selectable listing, wizard, and the like are related to different functionality and deployment options of the item selected by a visitor. The options also typically include deployment destination options, such as deploying a selected item in a cloud and which cloud (e.g., a cloud of the visitor's organization, a cloud of a software provider or marketplace 110 host, a third-party hosted cloud contracted by the visitor's organization, or other cloud). Other deployment destination options may also be provided, such as a deployment to an application instance of the visitor's organization or integrated therewith. The visitor may also provide connectivity information (i.e., network location identify data such as a network address and security credential data) to allow deployment processes triggered through the marketplace to deploy code, content, and data to a specified destination. Such options, in particular the option to specify a deployment destination of a software provider or marketplace host 110 cloud allows the particular deployment template to be deployed without requiring an organization to utilize existing hardware or procure and maintain additional hardware upon which the deployment template will execute.

Through the querying of the marketplace 110 visitor for requirement and deployment information and the ability to aggregate pre-assembled, pre-configured, and pre-tested deployment templates into a virtual software appliance for rapid deployment to a cloud or other location, organizational exposure in choosing to implement, modify, configure, and maintain complex software systems is significantly mitigated.

Various embodiments include not only the ability to implement pre-assembled software functionality and content through deployment templates assembled into virtual software appliances as already discussed, but also the ability to move virtual software appliance instances via cloud logistic services. Cloud logistic services in such embodiments provide various abilities such as an ability to deploy virtual software appliances to a cloud, move or clone a deployed virtual software appliance from one cloud to another, perform automated testing of deployed virtual software appliances, and the like. Such services may include translating a virtual software appliance from one form that is tailored to execute within one virtual machine-type environment of a particular cloud to a virtual machine-type environment of another particular cloud. For example, a translation from a form tailored to a VMware® virtual machine to a form tailored to an Amazon® hosted cloud. Some such embodiments may include assembling a new virtual software appliance including deployment templates tailed to the particular cloud-type.

The deployment options and the cloud logistic services may also provide options to transport virtual software appliances and instantiated instances of virtual software appliances between clouds via non-networked mechanisms. Such embodiments may utilize USB hard disks, memory sticks, optical disks, and other data storage devices. The data to be transported and executable code of a cloud logistic service may be loaded on to the particular data storage device and then coupled to a device capable of loading the data from the data storage device to the target cloud.

The cloud logistics services may be provided via a computing device or computing environment through which the marketplace 110 is also provided. However, the cloud logistics services may be provided via one or more other computing devices coupled to the network 108. The cloud logistics services typically have access to the deployment templates that may be stored in a database, virtual software appliances that may be stored in a staging area or other location, on one or more data storage devices, or other storage mechanism. In some embodiments, when the marketplace 110 receives input from a visitor and further input to instantiate a virtual software appliance instance, the marketplace 110 communicates commands and data based on received visitor input to the cloud factory 111. The cloud factory 111 then determines which deployment template or templates to select, assembles them into a virtual software appliance, and deploys the virtual software appliance according to the received input. The deployed virtual software appliance may then be configured according to the received visitor input, if such configuration is necessary. Any needed integration with other application instances or data copying therefrom may also be performed. Once these tasks and any other tasks as needed according to the context of the deployment template(s) and virtual software appliance are completed, such as automated testing, the visitor and other users within the user's organization may be provided access to the deployed deployment template.

In some instances, an evaluation instance of an application or an application add-on or enhancement may be instantiated in a demonstration cloud for evaluation by a customer. The customer then utilizes the evaluation instance to try out the instance and ensure it meets their needs and requirements. As the customer gains confidence, the evaluation instance may then be converted to a prototype instance by providing additional input as to requirements, customer data, integration with another computer system, and the like. In some embodiments, the prototype instance may then be cloned to a development or testing cloud environment. Customer-specific development or enhancements may be made here, if needed. At any point, when the customer decides a particular instance is ready to go-live, the instance that is ready may be cloned to a production environment and tested to ensure the cloning process was successful and that the cloud environment is properly configured and operational. The production instance may then go live. As the underlying implemented deployment template(s) included in a deployed virtual software appliance are pre-assembled, pre-configured, and pre-tested for their respective purposes, this process can move very quickly and with minimized risk. Further, the initial financial outlays of the customer are minimized because the customer is not required to purchase and maintain hardware at any point, although the customer does have the option to utilize their own cloud environment for deployment. Additionally, as most of these processes are automated, including the selection of the deployment template(s), assembly of the virtual software appliance, deployment, testing, and cloning, the human effort needed is minimized, and therefore the cost associated therewith is also minimized.

Figure 2:
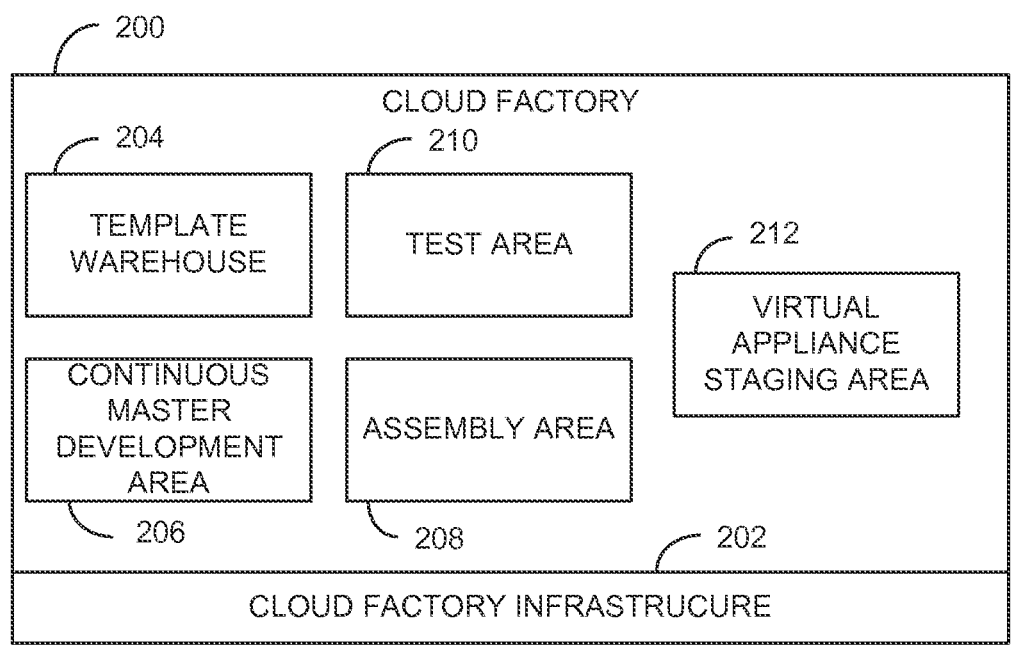
FIG. 2 is a logical block diagram of a system, according to an example embodiment.

FIG. 2 is a logical block diagram of a system, according to an example embodiment. The system is an example of a cloud factory 200, such as cloud factory 111 illustrated and described with regard to FIG. 1. The cloud factory 200 includes a cloud factory infrastructure 202, a template warehouse 204, a continuous master development area 206, and an assembly area 208. The cloud factory 200 may further include a test area 210 and a virtual appliance staging area 212. However, not all embodiments of the cloud factory 200 need include all such elements.

The cloud factory infrastructure 202 includes a set of services to facilitate communication between the different elements of the cloud factory 200 and with entities outside of the cloud factory 200, such as the marketplace 110 illustrated and described with regard to FIG. 1 and virtual computing environments to which virtual software appliances are to be deployed. Communication via the cloud factory infrastructure 202 services is generally performed in accordance with the CLO of the particular embodiment. For example, the cloud factory 200, in some embodiments, operates to receive requirement data in a CLO compatible form via a cloud factory infrastructure 202 service. The cloud factory infrastructure 202 service may then query the template warehouse 204 that stores deployment templates in a database indexed according to the CLO to obtain one or more deployment templates satisfying the requirements. The obtained deployment templates may then be assembled in the assembly area 208 or copied to the virtual appliance staging area 212. In typically embodiments, a cloud factory infrastructure 202 service will eventually package deployment templates stored in the virtual appliance staging area 212 into a deployment data structure and effect transport of the transport data structure to a target virtual computing environment.

The test area 210 is one or more virtual computing environments (i.e., a virtual machine) within which assembled virtual software appliances may be tested prior to transport. This may include one or both deployment and functional testing. Further, a virtual software appliance deployed to the test area 210 may be customized therein. Once the virtual software appliance deployed in the test area 210 is acceptable, the virtual software appliance may then be deployed. However, when the virtual software appliance has been customized in the test area 210, a clone may be taken thereof and a deployable virtual software appliance generated therefrom through one or more cloud factory infrastructure 202 services. This will typically include copying a directory structure of the test area 210 to which binaries, configuration files, and data files are deployed and the binaries, configuration files, and data files deployed therein.

The continuous master development area 206 is an area within the cloud factory 206 where deployment templates and other cloud factory content and services may be developed, refined, and tested.

Figure 3:
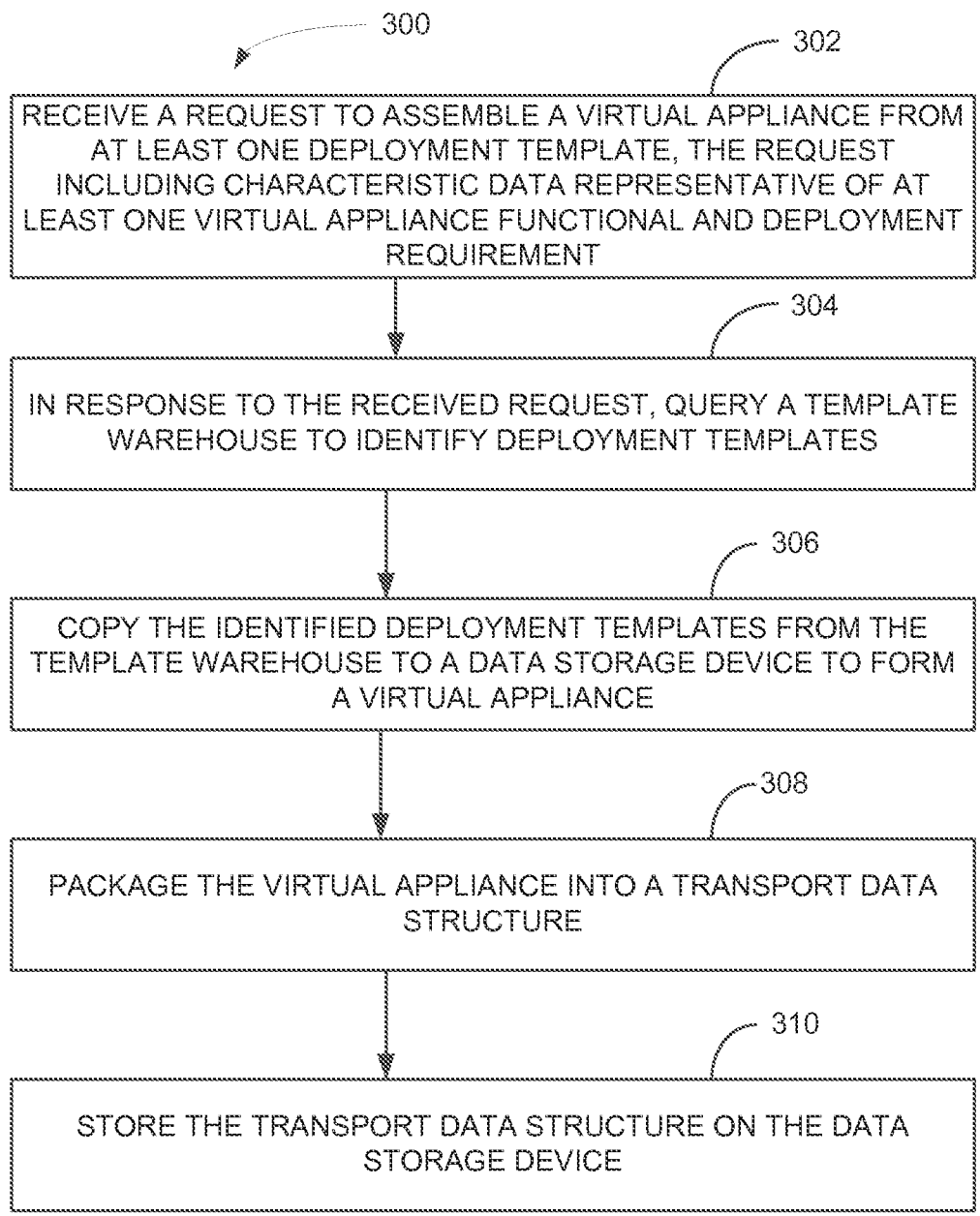
FIG. 3 is a block flow diagram of a method, according to an example embodiment.

FIG. 3 is a block flow diagram of a method 300, according to an example embodiment. The method 300 is an example of a method performed to build a virtual software appliance. The method 300 includes receiving 302 a request to assemble a virtual appliance from at least one deployment template. The request in some embodiments includes characteristic data representative of at least one virtual appliance functional and deployment requirement. The characteristic data will typically be in conformance with a CLO of the particular embodiment. The method 300, in response to the received 302 request, further includes querying 304 a template warehouse to identify deployment templates based on the characteristics identified in the request. The template warehouse in such embodiments stores deployment templates indexed according to the ontology identifying characteristics of stored deployment templates. Each of the deployment template stored in the template warehouse includes at least one of binaries, configuration files, and data files of at least a portion of a computing application. The method 300 also includes copying 306 the identified deployment templates from the template warehouse to a data storage device to form a virtual appliance. The method 300 may then package 308 the virtual appliance into a transport data structure and store 310 the transport data structure on the data storage device.

Subsequently, some embodiments of the method 300 include transporting the transport data structure to a data processing environment within which the virtual appliance is to be deployed. In some such embodiments, the received 302 request may include further data identifying the data processing environment within which the virtual appliance is to be deployed and transmitting, via a network, the transport data structure to that data processing environment. The aggregate set of characteristic data included in the virtual appliance of the transport data structure then provides information to a deployment process to deploy the virtual appliance.

In some embodiments of the method 300, characteristic data representative of at least one virtual appliance functional requirement includes data identifying characteristics of functions to be performed or facilitated by the virtual appliance to be assembled. Such functional requirements may identify business processes or variants thereof. For example, whether a customer utilizes cash or accrual based accounting, countries of business, and other such data that may have an impact on functions performed processes, and process variants as may be facilitated by software of a virtual software appliance. Further, characteristic data representative of a deployment requirement may include data identifying characteristics of an operating environment to which the virtual appliance is to be assembled. Such data may identify a virtual machine of the environment, an amount of memory and storage available, and other such data.

In another embodiment, the virtual appliance may include an aggregate set of characteristic data copied from the template warehouse for each deployment template included in the virtual appliance. The characteristic data in such embodiments identifies functional capabilities and deployment requirements for the virtual appliance based on respective deployment templates included in the virtual appliance. The deployment requirements typically include data identifying data storage structures to which elements of each deployment template are to be stored when deployed.

In some embodiments, the method 300 further includes deploying the virtual appliance within an assembly area virtual computing environment and receiving at least one modification to the deployed virtual appliance. Subsequently, a command may be received to package the virtual appliance. A file storage structure, binaries, configuration data, and data files of the deployed virtual appliance may then be copied and the virtual appliance copy may then be packaged into the transport data structure. The transport data structure may then be stored.

Figure 4:
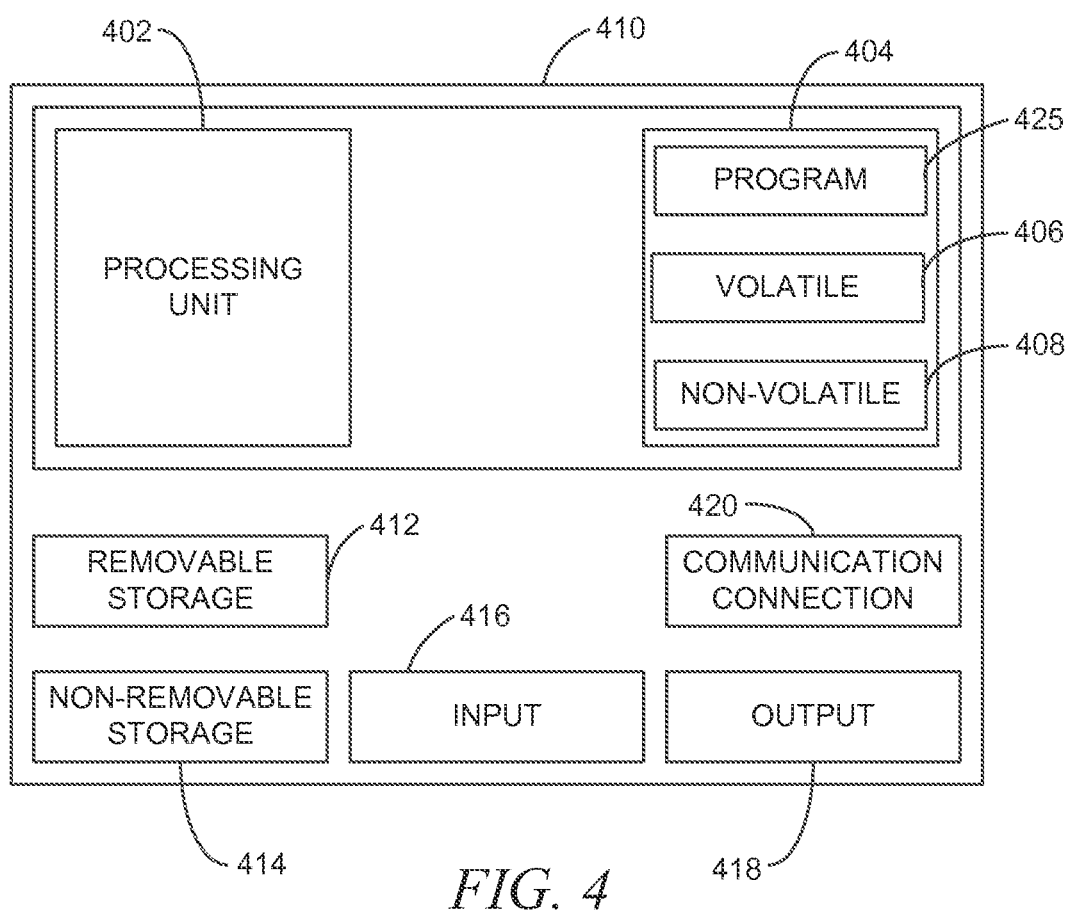
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of performing one or more of the methods discussed herein.

Another embodiment is in the form of a system that includes at least one processor and at least one memory device. The system further includes a database management system (DBMS), a request module, and a staging module. The DBMS in such embodiments stores and manages data stored on the at least one memory device. Such data includes a template warehouse including deployment templates indexed and searchable within the DBMS according to an ontology identifying characteristics of stored deployment templates. Each of such deployment templates includes at least one of binaries, configuration files, and data files of at least a portion of a computing application.

The request module is executable by the at least one processor to receive a request to assemble a virtual appliance from at least one deployment template. Such a request typically includes characteristic data representative of at least one virtual appliance functional and deployment requirement. Based thereon, the request module may then query the template warehouse to identify deployment templates.

The staging module is executable by the at least one processor to copy the deployment templates identified by the request module from the template warehouse. The staging module is further executable to package the virtual appliance into a transport data structure and store the transport data structure on the data storage device.

Some embodiments of the system may include an assembly module executable by the at least one processor to deploy the virtual appliance within an assembly area virtual computing environment. Subsequently, the assembly module may receive a command to package the virtual appliance that was previously deployed. The assembly module may then be executed to copy a file storage structure, binaries, configuration data, and data files of the deployed virtual appliance, including any modifications made thereto. The assembly module may then call the staging module to performing the packaging of the virtual appliance into the transport data structure and storing of the transport data structure on the data storage device based thereon. Subsequently, a transport module, as included in some embodiments, may be called. The transport module is typically executable by the at least one processor to transport the transport data structure to a data processing environment within which the virtual appliance is to be deployed.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:
1. A method comprising:
receiving a request to assemble a virtual appliance from at least one deployment template, the request including characteristic data representative of at least one virtual appliance functional and deployment requirement, wherein:

characteristic data representative of at least one virtual appliance functional requirement includes data identifying characteristics of functions to be performed or facilitated by the virtual appliance to be assembled; and characteristic data representative of a deployment requirement includes data identifying characteristics of an operating environment to which the virtual appliance is to be assembled;

in response to the received request, querying a template warehouse to identify deployment templates, the template warehouse storing deployment templates indexed according to an ontology identifying characteristics of stored deployment templates, each deployment template including at least one of binaries, configuration files, and data files of at least a portion of a computing application;

copying the identified deployment templates from the template warehouse to a data storage device to form a virtual appliance;

packaging the virtual appliance into a transport data structure; and storing the transport data structure on the data storage device.

2. The method of claim 1, further comprising:
deploying the virtual appliance within an assembly area virtual computing environment;
receiving at least one modification to the deployed virtual appliance;
receiving a command to package the virtual appliance;
copying a file storage structure, binaries, configuration data, and data files of the deployed virtual appliance and performing the packaging of the virtual appliance into the transport data structure and storing of the transport data structure on the data storage device based thereon.

3. The method of claim 1, wherein the virtual appliance includes an aggregate set of characteristic data copied from the template warehouse for each deployment template included in the virtual appliance, the characteristic data identifying functional capabilities and deployment requirements for the virtual appliance based on respective deployment templates included in the virtual appliance, the deployment requirements including data identifying data storage structures to which elements of each deployment template are to be stored when deployed.

4. The method of claim 3, further comprising:
transporting the transport data structure to a data processing environment within which the virtual appliance is to be deployed.

5. The method of claim 4, wherein:
the received request includes further data identifying the data processing environment within which the virtual appliance is to be deployed; and
transporting the transport data structure to the data processing environment within which the virtual appliance is to be deployed includes:
transmitting, via a network, the transport data structure to the data processing environment within which the virtual appliance is to be deployed, the aggregate set of characteristic data included in the virtual appliance of the transport data structure providing information to a deployment process to deploy the virtual appliance.

6. The method of claim 5, further comprising:
calling, via the network, a deployment process of an agent that executes within the data processing environment to which the virtual appliance is to be deployed.

7. A non-transitory computer-readable medium, with instructions stored thereon which when executed by at least one processor of at least one computing device causes the at least one computing device to:
- receive a request to assemble a virtual appliance from at least one deployment template, the request including characteristic data representative of at least one virtual appliance functional and deployment requirement, wherein:
  - characteristic data representative of at least one virtual appliance functional requirement includes data identifying characteristics of functions to be performed or facilitated by the virtual appliance to be assembled, and
  - characteristic data representative of a deployment requirement includes data identifying characteristics of an operating environment to which the virtual appliance is to be assembled;
- in response to the received request, query a template warehouse to identify deployment templates, the template warehouse storing deployment templates indexed according to an ontology identifying characteristics of stored deployment templates;
- copy the identified deployment templates from the template warehouse to a data storage device to form a virtual appliance;
- package the virtual appliance into a transport data structure; and
- store the transport data structure on the data storage device.

8. The non-transitory computer-readable medium of claim 7, wherein the instructions are further executable to cause the at least one computing device to:
- deploy the virtual appliance within an assembly area virtual computing environment;
- receive at least one modification to the deployed virtual appliance;
- receive a command to package the virtual appliance;
- copy a file storage structure, binaries, configuration data, and data files of the deployed virtual appliance and performing the packaging of the virtual appliance into the transport data structure and storing of the transport data structure on the data storage device based thereon.

9. The non-transitory computer-readable medium of claim 7, wherein the virtual appliance includes an aggregate set of characteristic data copied from the template warehouse for each deployment template included in the virtual appliance, the characteristic data identifying functional capabilities and deployment requirements for the virtual appliance based on respective deployment templates included in the virtual appliance.

10. The non-transitory computer-readable medium of claim 9, wherein the instructions are further executable to cause the at least one computing device to:
- transport the transport data structure to a data processing environment within which the virtual appliance is to be deployed.

11. The non-transitory computer-readable medium of claim 10, wherein:
- the received request includes further data identifying the data processing environment within which the virtual appliance is to be deployed; and
- transporting the transport data structure to the data processing environment within which the virtual appliance is to be deployed includes writing the transport data structure to a portable media device from which the transport data structure can be copied into the data processing environment within which the virtual appliance is to be deployed.

12. The non-transitory computer-readable medium of claim 11, wherein the aggregate set of characteristic data included in the virtual appliance of the transport data structure provides deployment information to a deployment process of an agent that executes within the data processing environment within which the virtual appliance is to be deployed.

13. A system comprising:
- at least one processor and at least one memory device;
- a database management system (DBMS) storing and managing data stored on the at least one memory device, the data stored and managed by the DBMS including a template warehouse including deployment templates indexed and searchable within the DBMS according to an ontology identifying characteristics of stored deployment templates, each deployment template including at least one of binaries, configuration files, and data files of at least a portion of a computing application;
- a request module executable by the at least one processor to:
  - receive a request to assemble a virtual appliance from at least one deployment template, the request including characteristic data representative of at least one virtual appliance functional and deployment requirement, wherein:
    - characteristic data representative of at least one virtual appliance functional requirement includes data identifying characteristics of functions to be performed or facilitated by the virtual appliance to be assembled, and
    - characteristic data representative of a deployment requirement includes data identifying characteristics of an operating environment to which the virtual appliance is to be assembled; and
  - query the template warehouse in response to the received request to identify deployment templates; and
- a staging module executable by the at least one processor to:
  - copy the identified deployment templates from the template warehouse;
  - package the virtual appliance into a transport data structure; and
  - store the transport data structure on the data storage device.

14. The system of claim 13, further comprising:
an assembly module executable by the at least one processor to:
- deploy the virtual appliance within an assembly area virtual computing environment;
- receive a command to package the virtual appliance;
- copy a file storage structure, binaries, configuration data, and data files of the deployed virtual appliance, including any modifications made thereto, and calling the staging module to performing the packaging of the virtual appliance into the transport data structure and storing of the transport data structure on the data storage device based thereon.

15. The system of claim 13, wherein the virtual appliance includes an aggregate set of characteristic data copied from the template warehouse for each deployment template included in the virtual appliance, the characteristic data identifying functional capabilities and deployment requirements for the virtual appliance based on respective deployment templates included in the virtual appliance.

16. The system of claim 15, further comprising:
a transport module executable by the at least one processor to:
   transport the transport data structure to a data processing environment within which the virtual appliance is to be deployed.

17. The system of claim 16, further comprising:
at least one network interface device, and wherein:
   a request received by the request module includes data identifying a data processing environment within which the virtual appliance is to be deployed; and
   the transport module, in transporting the transport data structure to the data processing environment identified in the request received by the request module transmits, via the at least one network interface device, the transport data structure to the data processing environment within which the virtual appliance is to be deployed.

* * * * *